United States Patent
Kim

(10) Patent No.: US 8,684,934 B2
(45) Date of Patent: Apr. 1, 2014

(54) ADAPTIVELY PERFORMING CLUTTER FILTERING IN AN ULTRASOUND SYSTEM

(75) Inventor: Tae Yun Kim, Seoul (KR)

(73) Assignee: Samsung Medison Co., Ltd., Kangwon-Do (KR)

( * ) Notice: Subject to any disclaimer, the term of this patent is extended or adjusted under 35 U.S.C. 154(b) by 618 days.

(21) Appl. No.: 12/878,903

(22) Filed: Sep. 9, 2010

(65) Prior Publication Data

US 2011/0118606 A1    May 19, 2011

(30) Foreign Application Priority Data

Nov. 16, 2009    (KR) .................. 10-2009-0110223

(51) Int. Cl.
*A61B 8/00*    (2006.01)

(52) U.S. Cl.
USPC .......... 600/453; 702/189; 702/190; 702/194; 702/196; 702/199; 73/570; 73/587; 73/620; 367/155

(58) Field of Classification Search
None
See application file for complete search history.

(56) References Cited

U.S. PATENT DOCUMENTS

| | | | | |
|---|---|---|---|---|
| 6,110,113 | A * | 8/2000 | Banjamin et al. ............ | 600/441 |
| 6,146,331 | A * | 11/2000 | Wong ........................... | 600/454 |
| 6,618,493 | B1 * | 9/2003 | Torp et al. .................... | 382/131 |
| 2004/0199078 | A1 * | 10/2004 | Mo et al. ...................... | 600/437 |
| 2005/0148875 | A1 * | 7/2005 | Sato ............................. | 600/453 |
| 2006/0036175 | A1 * | 2/2006 | Guracar et al. ............... | 600/458 |
| 2006/0100520 | A1 * | 5/2006 | Mo et al. ...................... | 600/457 |

FOREIGN PATENT DOCUMENTS

| | | |
|---|---|---|
| EP | 1 067 400 A2 | 1/2001 |
| JP | 2004-195228 | 7/2004 |
| JP | 2008-149153 | 7/2008 |
| KR | 10-2000-0073096 | 12/2000 |

OTHER PUBLICATIONS

Korean Office Action, issued in Korean Patent Application No. 10-2009-0110223, dated Oct. 31, 2011.
Extended European Search Report issued in European Patent Application No. EP 10174362.3 dated Apr. 29, 2013.
Yu et al., "A New Eigen-Based Clutter Filter Using the Hankel-SVD Approach," 2006 IEEE Ultrasonics Symposium.

(Continued)

*Primary Examiner* — Unsu Jung
*Assistant Examiner* — Michael N Fisher
(74) *Attorney, Agent, or Firm* — McDermott Will & Emery LLP

(57) ABSTRACT

Embodiments of adaptively performing clutter filtering are disclosed. In one embodiment, by way of non-limiting example, an ultrasound system comprises: an ultrasound data acquisition unit configured to transmit and receive ultrasound signals to and from a target object to output a plurality of ultrasound data corresponding to each pixel of a color Doppler mode image; and a processing unit in communication with the ultrasound data acquisition unit and being configured to calculate a power difference value corresponding to each of the pixels based on the plurality of ultrasound data, determine whether the power difference value is equal to or larger than a first threshold value, and if the power difference value is equal to or larger than the first threshold value, then perform first clutter filtering upon the plurality of ultrasound data, or if the power difference value is less than the first threshold value, then perform second clutter filtering upon the plurality of ultrasound data.

15 Claims, 5 Drawing Sheets

(56) References Cited

OTHER PUBLICATIONS

Yu et al., "Single-Ensemble-Based Eigen-Processing Methods for Color Flow Imaging—Part I. The Hankel-SVD Filter," IEEE Transactions on Ultrasonics, Ferroelectrics, and Frequency Control, vol. 55, No. 3, Mar. 2008.

Ledoux et al., "Reduction of the Clutter Component in Doppler Ultrasound Signals Based on Singular Value Decomposition: a Simulation Study," Ultrasonic Imaging 19, 1-18 (1997).

Wang et al., "An Improved Mean Frequency Estimator for Ultrasonic Color Flow Imaging Using Second-Order Autoregressive Model," Proceedings of the 2005 IEEE, Engineering in Medicine and Biology 27th Annual Conference.

* cited by examiner

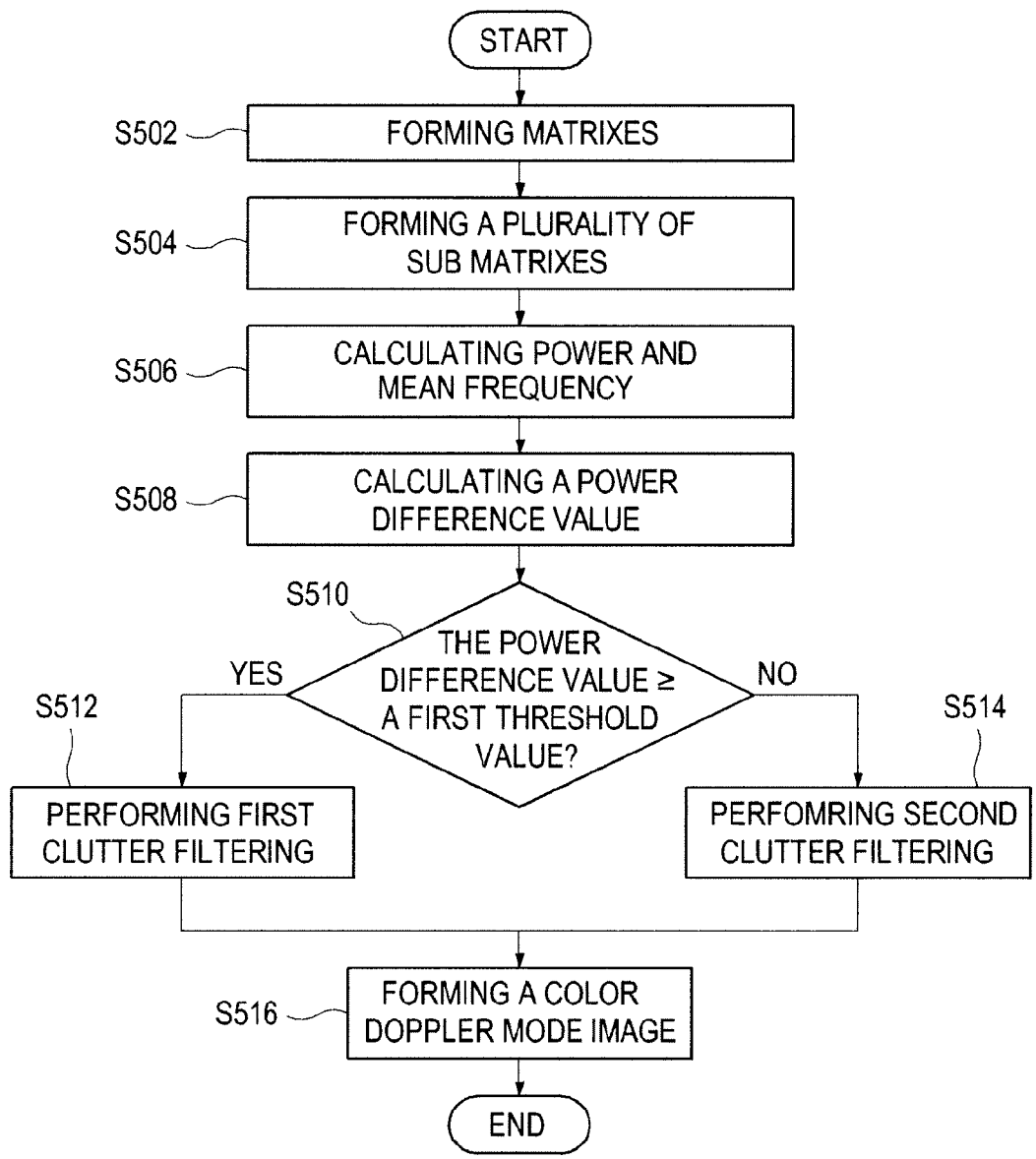

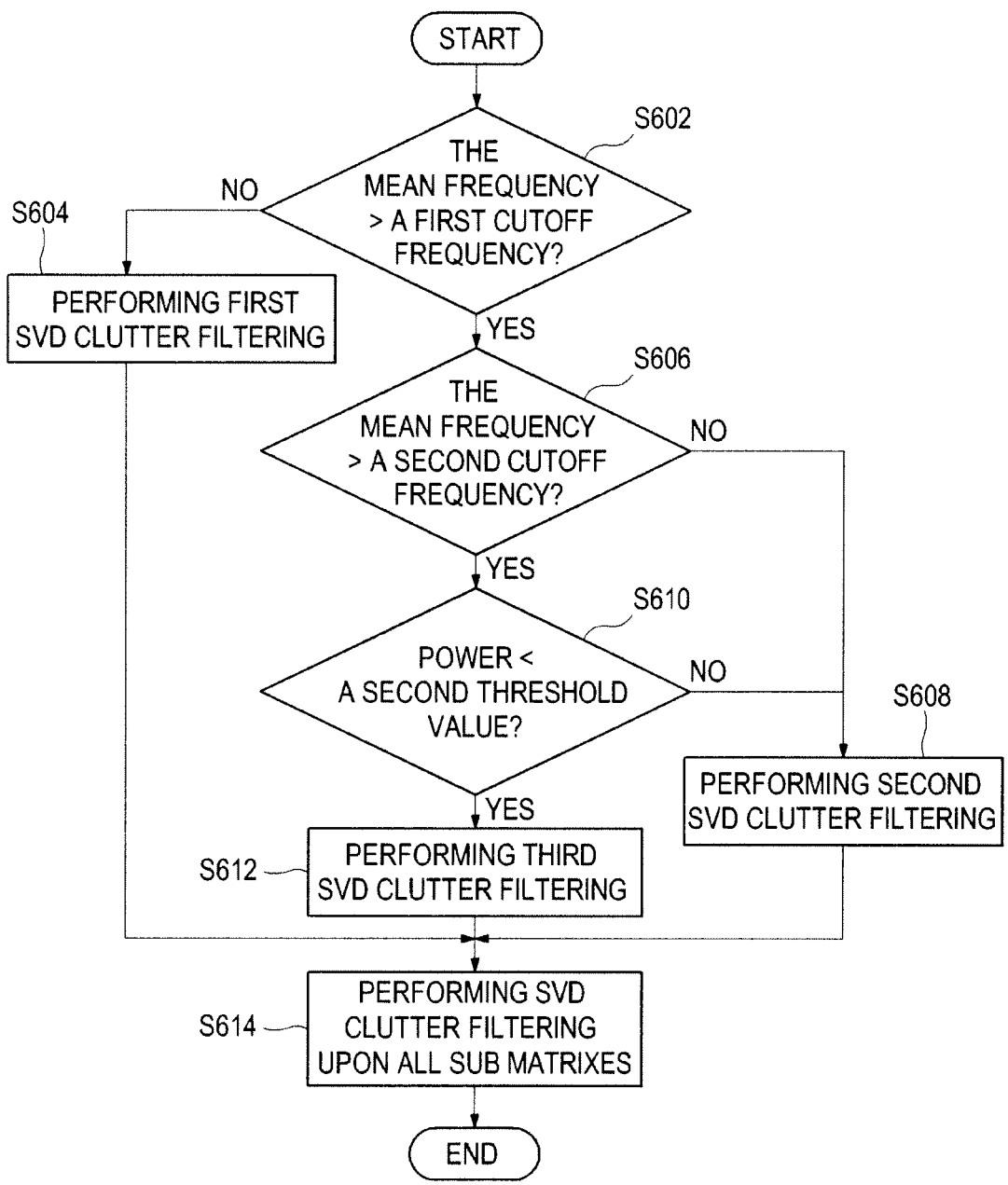

ADAPTIVELY PERFORMING CLUTTER FILTERING IN AN ULTRASOUND SYSTEM

CROSS-REFERENCE TO RELATED APPLICATIONS

The present application claims priority from Korean Patent Application No. 10-2009-0110223 filed on Nov. 16, 2009, the entire subject matter of which is incorporated herein by reference.

TECHNICAL FIELD

The present disclosure generally relates to ultrasound systems, and more particularly to adaptively performing clutter filtering in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional ultrasound images of internal features of a target object (e.g., human organs).

To provide the ultrasound images, the ultrasound system operates in various image modes such as a brightness mode (B mode), a Doppler mode and the like to acquire ultrasound images for diagnosis.

In the Doppler mode, the ultrasound system provides a color Doppler mode image showing velocities of moving objects such as the heart, blood flow, etc. The color Doppler mode image may be formed based on Doppler signals obtained by alternately transmitting and receiving ultrasound signals to and from a target object. The Doppler signals may include a low frequency signal (so-called clutter signal) due to the motion of a cardiac wall or valve of a heart. The clutter signal may have an amplitude which is over 100 times greater than that of pure Doppler signals indicative of velocities of the blood flow. The clutter signal may be an obstacle for accurately detecting the velocity of blood flow. Thus, it is required to remove the clutter signal from the Doppler signals for an accurate velocity detection of the blood flow. The ultrasound system typically adopts a clutter filter that may be a high pass filter, an eigenvector-based clutter filter, a singular value decomposition (SVD) clutter filter and the like to remove the clutter signal from the Doppler signals.

SUMMARY

Embodiments for adaptively setting an optimal image parameter in an ultrasound system are disclosed herein. In one embodiment, by way of non-limiting example, an ultrasound system comprises: an ultrasound data acquisition unit configured to transmit and receive ultrasound signals to and from a target object to thereby output a plurality of ultrasound data corresponding to each pixel of a color Doppler mode image; and a processing unit in communication with the ultrasound data acquisition unit and being configured to calculate a power difference value corresponding to each of the pixels based on the plurality of ultrasound data, determine whether the power difference value is equal to or larger than a first threshold value, and if the power difference value is equal to or larger than the first threshold value, then perform first clutter filtering upon the plurality of ultrasound data, or if the power difference value is less than the first threshold value, then perform second clutter filtering upon the plurality of ultrasound data.

In another embodiment, there is provided a method of performing clutter filtering, comprising: a) acquiring a plurality of ultrasound data corresponding to each pixel of a color Doppler mode image for a target object; b) calculating a power difference value corresponding to each of the pixels based on the plurality of ultrasound data; c) determining whether the power difference value is equal to or larger than a first threshold value; and d) if the power difference value is equal to or larger than the first threshold value, then performing first clutter filtering upon the plurality of ultrasound data, or if the power difference value is less than the first threshold value, then performing second clutter filtering upon the plurality of ultrasound data.

In yet another embodiment, there is provided a computer readable medium comprising computer executable instructions configured to perform the following acts: a) acquiring a plurality of ultrasound data corresponding to each pixel of a color Doppler mode image for a target object; b) calculating a power difference value corresponding to each of the pixels based on the plurality of ultrasound data; c) determining whether the power difference value is equal to or larger than a first threshold value; and d) if the power difference value is equal to or larger than the first threshold value, then performing first clutter filtering upon the plurality of ultrasound data, or if the power difference value is less than the first threshold value, then performing second clutter filtering upon the plurality of ultrasound data.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

BRIEF DESCRIPTION OF THE DRAWINGS

FIG. 5 is a flow chart showing a process of adaptively performing clutter filtering.

FIG. 6 is a flow chart showing a process of performing SVD clutter filtering.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
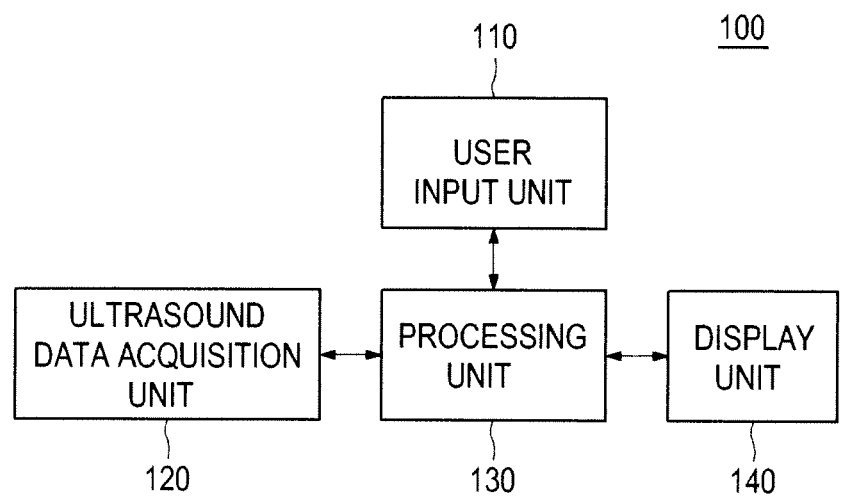
FIG. 1 is a block diagram showing an illustrative embodiment of an ultrasound system.
Figure 2:
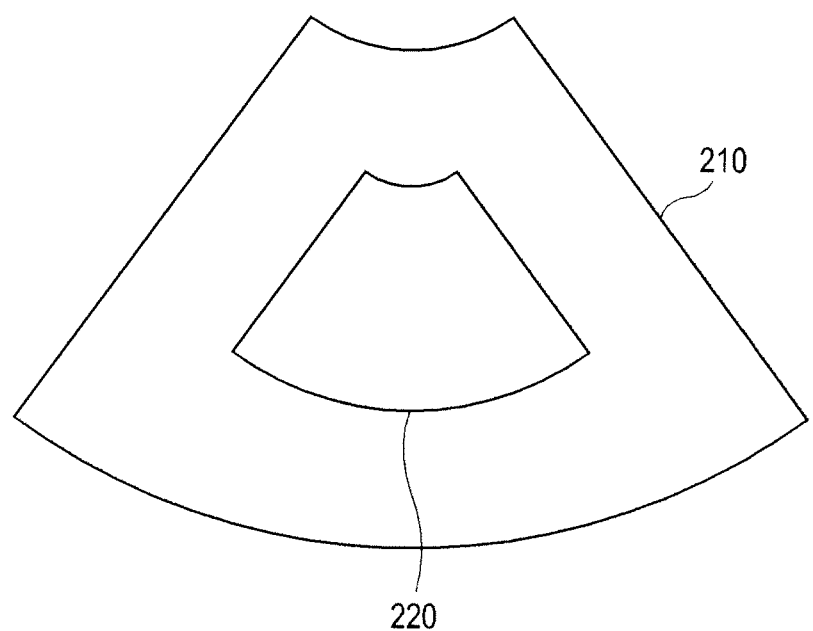
FIG. 2 is a schematic diagram showing an example of a brightness mode (B mode) image and a region of interest (ROI).

FIG. 1 is a block diagram showing an illustrative embodiment of an ultrasound system. Referring to FIG. 1, the ultrasound system 100 may include a user input unit 110. The user input unit 110 may be configured to receive input information from a user. FIG. 2 is a schematic diagram showing an example of a brightness mode (B mode) image and a region of interest (ROI). In one embodiment, the input information may include information for setting the ROI 220 on the B mode image 210 of a target object, as shown in FIG. 2. The ROI 220 may include a color box for obtaining a color Doppler mode image. The user input unit 110 may include a control panel, a mouse, a keyboard and the like.

The ultrasound system 100 may further include an ultrasound data acquisition unit 120. The ultrasound data acquisition unit 120 may be configured to transmit and receive ultrasound signals to and from the target object to thereby output ultrasound data.

Figure 3:
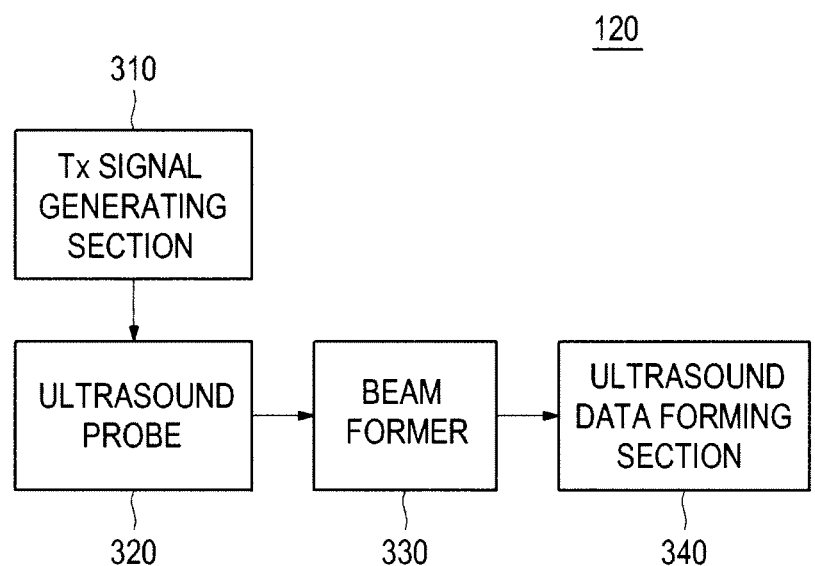
FIG. 3 is a block diagram showing an illustrative embodiment of an ultrasound data acquisition unit.

FIG. 3 is a block diagram showing an illustrative embodiment of the ultrasound data acquisition unit. Referring to FIG. 3, the ultrasound data acquisition unit 120 may include a transmit (Tx) signal generating section 310, an ultrasound probe 320, a beam former 330 and an ultrasound data forming section 340.

The Tx signal generating section 310 may be configured to generate Tx signals. In one embodiment, the Tx signal generating section 310 may generate first Tx signals for obtaining the B mode image 210, and a plurality of second Tx signals for obtaining a color Doppler mode image corresponding to the ROI 220 based on a predetermined ensemble number. The ensemble number may represent the number of transmitting and receiving ultrasound signals in order to obtain Doppler signals corresponding to each of the scan-lines.

The ultrasound probe 320 may include a plurality of elements (not shown) for reciprocally converting between ultrasound signals and electrical signals. The ultrasound probe 320 may be configured to transmit ultrasound data to the target object in response to the Tx signals provided from the Tx signal generating section 310. The ultrasound probe 320 may further receive ultrasound echo signals reflected from the target object to thereby form received signals. The received signals may be analog signals.

In one embodiment, the ultrasound probe 320 may transmit ultrasound signals to the target object in response to the first Tx signals provided from the Tx signal generating section 310. The ultrasound probe 320 may further receive ultrasound echo signals reflected from the target object to thereby form first received signals. The ultrasound probe 320 may further transmit ultrasound signals to the target object in response to each of the plurality of second Tx signals provided from the Tx signal generating section 310. The ultrasound probe 320 may further receive ultrasound echo signals reflected from the target object to thereby form a plurality of second received signals.

The beam former 330 may be configured to convert the received signals provided from the ultrasound probe 320 into digital signals. The beam former 330 may further apply delays to the digital signals in consideration of distance between the elements and focal points to thereby output digital receive-focused signals.

In one embodiment, the beam former 330 may convert the first received signals provided from the ultrasound probe 320 into first digital signals. The beam former 330 may further apply delays to the first digital signals in consideration of distance between the elements and focal points to thereby output first digital receive-focused signals. The beam former 330 may further convert the plurality of second received signals provided from the ultrasound probe 320 into a plurality of second digital signals. The beam former 330 may further apply delays to the plurality of second digital signals in consideration of distance between the elements and focal points to thereby output a plurality of second digital receive-focused signals.

The ultrasound data forming section 340 may be configured to form ultrasound data based on the digital receive-focused signals provided from the beam former 330. The ultrasound data forming section 340 may further perform signal processing (e.g., gain control, etc) upon the digital receive-focused signals.

In one embodiment, the ultrasound data forming section 340 may form first ultrasound data based on the first digital receive-focused signals provided from the beam former 330. The first ultrasound data may be radio frequency (RF) data. However, it should be noted herein that the first ultrasound data may not be limited thereto. The ultrasound data forming section 340 may further form a plurality of second ultrasound data corresponding to the ensemble number based on the plurality of second digital receive-focused signals provided from the beam former 330. The second ultrasound data may be in-phase/quadrature (IQ) data. However, it should be noted herein that the second ultrasound data may not be limited thereto.

Figure 4:
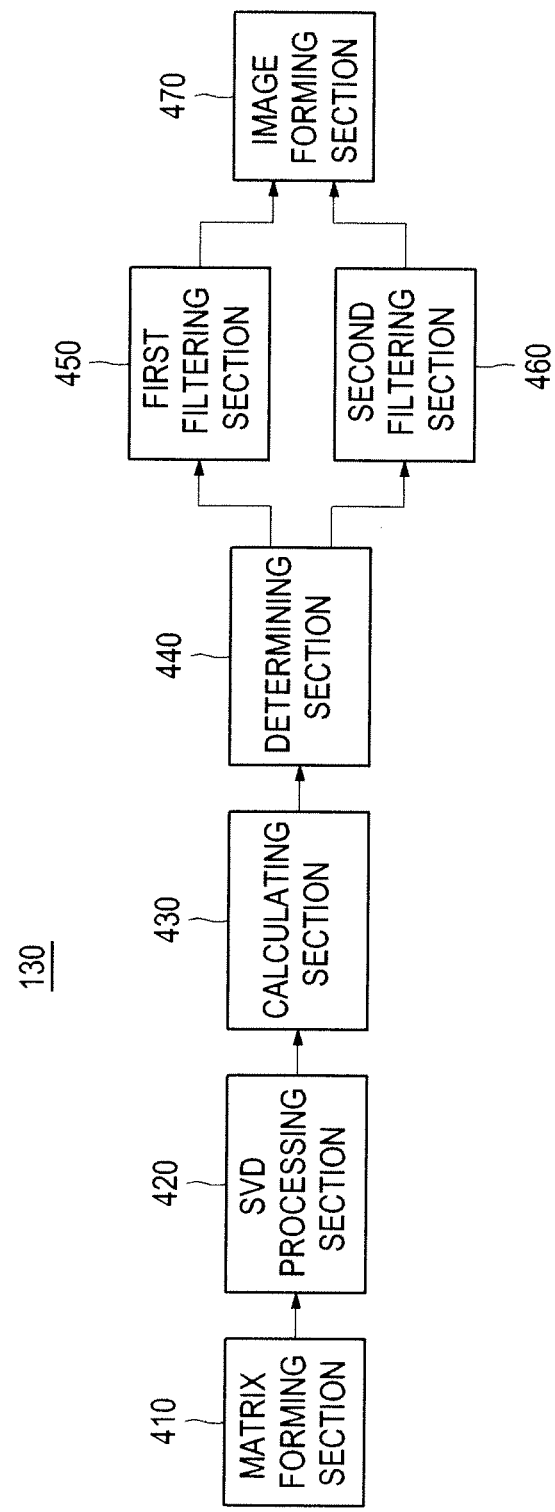
FIG. 4 is a block diagram showing an illustrative embodiment of a processing unit.

Referring back to FIG. 1, the ultrasound system 100 may further include a processing unit 130 in communication with the user input unit 110 and the ultrasound data acquisition unit 120. FIG. 4 is a block diagram showing an illustrative embodiment of the processing unit 130. Referring to FIG. 4, the processing unit 130 may include a matrix forming section 410, a singular value decomposition (SVD) processing section 420, a calculating section 430, a determining section 440, a first filtering section 450, a second filtering section 460 and an image forming section 470.

FIG. 5 is a flow chart showing a process of adaptively performing clutter filtering. The matrix forming section 410 may form matrixes corresponding to pixels of the color Doppler mode image based on the plurality of second ultrasound data, at step S502 in FIG. 5. As one example, when the plurality of second ultrasound data corresponding to a pixel of the color Doppler mode image are 2, 3, 5, 6, 7 and 8, the matrix forming section 410 may form a matrix HM having 3×2 size based on the plurality of second ultrasound data 2, 3, 5, 6, 7 and 8 as the following equation.

$$HM = \begin{bmatrix} 2 & 3 \\ 5 & 6 \\ 7 & 8 \end{bmatrix} \quad (1)$$

The matrix may include a Hankel matrix. However, it should be noted herein that the matrix may not be limited thereto.

The SVD processing section 420 may perform the SVD upon the matrixes formed by the matrix forming section 410 to thereby form a plurality of sub matrixes corresponding to each of the matrixes, at step S504 in FIG. 5. The methods of performing the SVD are well known in the art. Thus, they have not been described in detail so as not to unnecessarily obscure the present invention. As one example, the SVD processing unit 420 may perform the SVD upon the matrix HM to thereby form sub matrixes SM1 and SM2 corresponding to the matrix HM as the following equation.

$$SM1 = \begin{bmatrix} 2.3130 & 2.7353 \\ 5.0430 & 5.9637 \\ 6.8629 & 8.1159 \end{bmatrix}, \quad (2)$$

$$SM2 = \begin{bmatrix} -0.3130 & 0.2647 \\ -0.0430 & 0.0363 \\ 0.1371 & -0.1159 \end{bmatrix}$$

The calculating section 430 may calculate power for each of the plurality of sub matrixes formed by the SVD processing section 420, at step S506 in FIG. 5. As one example, the calculating section 430 may rearrange the sub matrix SM1 as the following equation.

$$SM1 = \left[ SM1(1,1), \frac{SM1(1,2)+SM1(2,1)}{2}, \frac{SM1(3,1)+SM1(2,2)}{2}, \right. \quad (3)$$
$$\left. SM1(3,2) \right]$$
$$= [2.3130, 3.8891, 6.4133, 8.1159]$$

The calculating section 430 may further perform an auto-correlation upon the rearranged sub matrix SM1 to thereby calculate the power corresponding to the rearranged sub matrix SM1. The calculating section 430 may further rearrange the sub matrix SM2 as the above equation. The calculating section 430 may further perform an autocorrelation upon the rearranged sub matrix SM2 to thereby calculate the power corresponding to the sub matrix SM2.

The calculating section 430 may further calculate a mean frequency for each of the plurality of sub matrixes formed by the SVD processing section 420, at step S506 in FIG. 5. As one example, the calculating section 430 may perform an autocorrelation upon the rearranged sub matrix SM1 to thereby calculate the mean frequency corresponding to the rearranged sub matrix SM1. The calculating section 430 may further perform an autocorrelation upon the rearranged sub matrix SM2 to thereby calculate the mean frequency corresponding to the sub matrix SM2.

The calculating section 430 may calculate a power difference value among the plurality of sub matrixes for each of the pixels, at step S508 in FIG. 5.

The determining section 440 may compare the power difference value with a predetermined first threshold value for each of the pixels, at step S510 in FIG. 5. If it is determined that the power difference value is equal to or larger than the first threshold value, then the first filtering section 450 may perform first clutter filtering upon the plurality of sub matrixes for each of the pixels, at step S512 in FIG. 5. In one embodiment, the first clutter filtering may include SVD clutter filtering.

FIG. 6 is a flow chart showing a process of performing the SVD clutter filtering. The first filtering section 450 may compare the mean frequency with a predetermined first cutoff frequency for each of the plurality of sub matrixes, at step S602 in FIG. 6.

If it is determined that the mean frequency is equal to or less than the first cutoff frequency, then the first filtering section 450 may perform the SVD clutter filtering ("first SVD clutter filtering") for removing the corresponding sub matrix as a clutter signal component, at step S604 in FIG. 6. As one example, the first filtering section 450 may compare the mean frequency of the sub matrix SM1 with the first cutoff frequency. If it is determined that the mean frequency of the sub matrix SM1 is equal to or less than the first cutoff frequency, then the first filtering section 450 may perform the first SVD clutter filtering for removing the sub matrix SM1 as the clutter signal component.

Alternatively, if it is determined that the mean frequency is larger than the first cutoff frequency, then the first filtering section 450 may compare the mean frequency of the corresponding sub matrix with a predetermined second cutoff frequency, at step S606 in FIG. 6. The second cutoff frequency may be larger than the first cutoff frequency.

Then, if it is determined that the mean frequency is equal to or less than the second cutoff frequency, then the first filtering section 450 may perform the SVD clutter filtering ("second SVD clutter filtering") for performing a matrix operation upon the corresponding sub matrix as a Doppler signal component, at step S608 in FIG. 6. The matrix operation may include a matrix addition operation.

As one example, if it is determined that the mean frequency of the sub matrix SM1 is equal to or less than the first cutoff frequency, and the mean frequency of the sub matrix SM2 is larger than the first cutoff frequency and is equal to or less than the second cutoff frequency, then the first filtering section 450 may perform the first SVD clutter filtering upon the sub matrix SM1, which is removed as a clutter signal component, and perform the second SVD clutter filtering upon the sub matrix SM2 to thereby form the clutter-filtered second ultrasound data M as the following equation.

$$M = SM2 = \begin{bmatrix} -0.3130 & 0.2647 \\ -0.0430 & 0.0363 \\ 0.1371 & -0.1159 \end{bmatrix} \quad (4)$$

As another example, when the mean frequencies of the sub matrixes SM1 and SM2 are larger than the first cutoff frequency and are equal to or less than the second cutoff frequency, the first filtering section 450 may perform the second SVD clutter filtering upon the sub matrixes SM1 and SM2 to thereby form clutter-filtered second ultrasound data M as the following equation.

$$M = SM1 + SM2 = \begin{bmatrix} 2 & 3 \\ 5 & 6 \\ 7 & 8 \end{bmatrix} \quad (5)$$

Alternatively, if the mean frequency is larger than the second cutoff frequency, then the first filtering section 450 may compare the power of the corresponding sub matrix with a predetermined second threshold value, at step S610 in FIG. 6.

If the power is equal to larger than the second threshold value, then the first filtering section 450 may perform the second SVD clutter filtering upon the corresponding sub matrix as mentioned above. Alternatively, if it is determined that the power is less than the second threshold value, then the first filtering section 450 may perform the SVD clutter filtering ("third SVD clutter filtering") for removing the corresponding sub matrix as a noise component, at step S612 in FIG. 6.

Then, the first filtering section 450 may perform the SVD clutter filtering upon all sub matrixes for each of the pixels of the color Doppler mode image at step S614 in FIG. 6.

Referring back to FIG. 5, if it is determined that the power difference value is less than the first threshold value, then the second filtering section 460 as shown in FIG. 4 may perform second clutter filtering upon the plurality of second ultrasound data, at step S514 in FIG. 5. The second clutter filtering may include infinite impulse response, regression filtering, eigenvector based filtering and the like. However, it should be noted herein that the second clutter filtering may not be limited thereto.

The image forming section 470 may form the color Doppler mode image based on the clutter-filtered second ultrasound data, at step S516 in FIG. 5. The image forming section 470 may further form the B mode image based on the first ultrasound data provided from the ultrasound data acquisition unit 120, as shown in FIG. 1.

Referring back to FIG. 1, the ultrasound system 100 may further include the display unit 140. The display unit 140 may display the color Doppler mode image. The display unit 140 may further display the B mode image.

In another embodiment, the present invention may provide a computer readable medium comprising computer executable instructions configured to perform the following acts: a) acquiring a plurality of ultrasound data corresponding to each of pixels of a color Doppler mode image for a target object; b) calculating a power difference value corresponding to each of the pixels based on the plurality of ultrasound data; c) determining whether the power difference value is equal to or larger than a first threshold value; and d) if the power difference value is equal to or larger than the first threshold value, then performing first clutter filtering upon the plurality of ultrasound data, or if the power difference value is less than the first threshold value, then performing second clutter filtering upon the plurality of ultrasound data. The computer readable medium may comprise a floppy disk, a hard disk, a memory, a compact disk, a digital video disk, etc.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
an ultrasound data acquisition device configured to transmit and receive ultrasound signals to and from a target object to output a plurality of ultrasound data corresponding to each pixel of a color Doppler mode image; and
a processor in communication with the ultrasound data acquisition device and being configured to:
form a matrix corresponding to each of the pixels based on the plurality of ultrasound data;
form a plurality of sub matrixes corresponding to each of the matrixes;
calculate a power difference value among the plurality of sub matrixes based on a mean frequency and a power corresponding to each of the plurality of sub matrixes;
determine whether the power difference value is equal to or larger than a first threshold value;
perform first singular value decomposition (SVD) clutter filtering for removing the sub matrix corresponding to the mean frequency as a clutter signal component and second SVD clutter filtering for performing a matrix operation upon the sub matrix corresponding to the mean frequency as a Doppler signal component based on the mean frequency, a predetermined first cutoff frequency and a predetermined second cutoff frequency when the power difference value is equal to or larger than the first threshold value; and
perform clutter filtering upon the plurality of ultrasound data when the power difference value is less than the first threshold value.

2. The ultrasound system of claim 1,
wherein the second clutter filtering comprises any one of infinite impulse response, regression filtering and eigenvector based filtering.

3. The ultrasound system of claim 2, wherein the processor is configured to:
perform SVD upon the matrix to form the plurality of sub matrixes corresponding to each of the matrixes; and
calculate the mean frequency and the power corresponding to each of the plurality of sub matrixes.

4. The ultrasound system of claim 3, wherein the processor is configured to:
compare the mean frequency with the predetermined first cutoff frequency when the power difference value is equal to or larger than the first threshold value;
perform the first SVD clutter filtering for removing the sub matrix corresponding to the mean frequency as a clutter signal component when the mean frequency is equal to or less than the first cutoff frequency when the power difference value is equal to or larger than the first threshold value; perform the first SVD clutter filtering for removing the sub matrix corresponding to the mean frequency as a clutter signal component when
compare the mean frequency with the predetermined second cutoff frequency when the mean frequency is larger than the first cutoff frequency, wherein the second cutoff frequency is larger than the first cutoff frequency; and
perform the second SVD clutter filtering for performing a matrix operation upon the sub matrix corresponding to the mean frequency as a Doppler signal component when the mean frequency is equal to or less than the second cutoff frequency.

5. The ultrasound system of claim 4, wherein the matrix operation comprises a matrix addition operation.

6. The ultrasound system of claim 4, wherein the processor is further configured to:
compare the power of the sub matrix corresponding to the mean frequency with a predetermined second threshold value when the mean frequency is larger than the second cutoff frequency;
perform third SVD clutter filtering for removing the sub matrix as a noise component when the power is less than the second threshold value; and
perform the second SVD clutter filtering upon the sub matrix corresponding to the power when the power is equal to or larger than the second threshold value.

7. A method of performing clutter filtering, comprising:
a) acquiring a plurality of ultrasound data corresponding to each pixel of a color Doppler mode image for a target object;
b) forming a matrix corresponding to each of the pixels based on the plurality of ultrasound data;
c) forming a plurality of sub matrixes corresponding to each of the matrixes;
d) calculating a power difference value among the plurality of sub matrixes based on a mean frequency and a power corresponding to each of the plurality of sub matrixes;
e) determining whether the power difference value is equal to or larger than a first threshold value;
f) performing first singular value decomposition (SVD) clutter filtering for removing the sub matrix corresponding to the mean frequency as a clutter signal component and second SVD clutter filtering for performing a matrix operation upon the sub matrix corresponding to the mean frequency as a Doppler signal component based on the mean frequency a redetermined first cutoff frequency and a predetermined second cutoff frequency when the power difference value is equal to or larger than the first threshold value; and g) performing clutter filtering upon the plurality of ultrasound data when the power difference value is less than the first threshold value.

8. The method of claim 7,
wherein the clutter filtering comprises one of infinite impulse response, regression filtering and eigenvector based filtering.

9. The method of claim 8, wherein the step c) comprises:
performing SVD upon the matrix to thereby form the plurality of sub matrixes corresponding to each of the matrixes; and
calculating the mean frequency corresponding to each of the plurality of sub matrixes.

10. The method of claim 9, wherein the step comprises:
comparing the mean frequency with the predetermined first cutoff frequency;
performing the first SVD clutter filtering for removing the sub matrix corresponding to the mean frequency as a clutter signal component when the mean frequency is equal to or less than the first cutoff frequency;
comparing frequency with the predetermined second cutoff frequency when the mean frequency is larger than the first cutoff frequency, wherein the second cutoff frequency is larger than the first cutoff frequency; and
performing the second SVD clutter filtering for performing a matrix operation upon the sub matrix corresponding to the mean frequency as a Doppler signal component when the mean frequency is equal to or less than the second cutoff frequency.

11. The method of claim 10, wherein the matrix operation comprises a matrix addition operation.

12. The method of claim 10, wherein the step f) further comprises:
comparing the power of the sub matrix corresponding to the mean frequency with a predetermined second threshold value when the mean frequency is larger than the second cutoff frequency;
performing third SVD clutter filtering for removing the sub matrix as a noise component when the power is less than the second threshold value; and
performing the second SVD clutter filtering upon the sub matrix corresponding to the power when the power is equal to or larger than the second threshold value.

13. A non-transitory computer readable medium comprising computer executable instructions, which causes a processor to perform following acts:
a) acquiring a plurality of ultrasound data corresponding to each pixel of a color Doppler mode image for a target object;
b) forming a matrix corresponding to each of the pixels based on the plurality of ultrasound data;
c) forming a plurality of sub matrixes corresponding to each of the matrixes;
d) calculating a power difference value among the plurality of sub matrixes based on a mean frequency and a power corresponding to each of the plurality of sub matrixes;
e) determining whether the power difference value is equal to or larger than a first threshold value;
f) performing first singular value decomposition (SVD) clutter filtering for removing the sub matrix corresponding to the mean frequency as a clutter signal component and second SVD clutter filtering for performing a matrix operation upon the sub matrix corresponding to the mean frequency as a Doppler signal component based on the mean frequency, a predetermined first cutoff frequency and a predetermined second cutoff frequency when the power difference value is equal to or larger than the first threshold value; and g) performing clutter filtering upon the plurality of ultrasound data when
the power difference value is less than the first threshold value.

14. An ultrasound system, comprising:
an ultrasound data acquisition device configured to transmit and receive ultrasound signals to and from a target object to output a plurality of ultrasound data corresponding to each of pixels of a color Doppler mode image; and
a processor in communication with the ultrasound data acquisition device and being configured to:
form a matrix corresponding to each of the pixels based on the plurality of ultrasound data;
form a plurality of sub matrixes corresponding to each of the matrixes;
calculate a power difference value among the plurality of sub matrixes based on a mean frequency and a power corresponding to each of the plurality of sub matrixes;
determine whether the power difference value is equal to or larger than a first threshold value;
compare the mean frequency with a predetermined first cutoff frequency when the power difference value is equal to or larger than the first threshold value;
perform first singular value decomposition (SVD) clutter filtering for removing the sub matrix corresponding to the mean frequency as a clutter signal component when the mean frequency is equal to or less than the first cutoff frequency;
compare the mean frequency with a predetermined second cutoff frequency when the mean frequency is larger than the first cutoff frequency, wherein the second cutoff frequency is larger than the first cutoff frequency;
perform second SVD clutter filtering for performing a matrix operation upon the sub matrix corresponding to the mean frequency as a Doppler signal component when the mean frequency is equal to or less than the second cutoff frequency; and
perform clutter filtering upon the plurality of ultrasound data when the power difference value is less than the first threshold value.

15. A method of performing clutter filtering, comprising:
a) acquiring a plurality of ultrasound data corresponding to each of pixels of a color Doppler mode image for a target object;
b) forming a matrix corresponding to each of the pixels based on the plurality of ultrasound data;
c) forming a plurality of sub matrixes corresponding to each of the matrixes;
d) calculating a power difference value among the plurality of sub matrixes based on a mean frequency and a power corresponding to each of the plurality of sub matrixes;
e) determining whether the power difference value is equal to or larger than a first threshold value;
f) comparing the mean frequency with a predetermined first cutoff frequency when the power difference value is equal to or larger than the first threshold value;
g) performing first singular value decomposition (SVD) clutter filtering for removing the sub matrix corresponding to the mean frequency as a clutter signal component when the mean frequency is equal to or less than the first cutoff frequency;

h) comparing the mean frequency with the predetermined second cutoff frequency when the mean frequency is larger than the first cutoff frequency, wherein the second cutoff frequency is larger than the first cutoff frequency;

i) performing second SVD clutter filtering for performing a matrix operation upon the sub matrix corresponding to the mean frequency as a Doppler signal component when the mean frequency is equal to or less than the second cutoff frequency; and j) performing clutter filtering upon the plurality of ultrasound data when the power difference value is less than the first threshold value.

\* \* \* \* \*